US011773753B2

(12) United States Patent
Mizumi et al.

(10) Patent No.: US 11,773,753 B2
(45) Date of Patent: Oct. 3, 2023

(54) TURBINE STATOR VANE, TURBINE STATOR VANE ASSEMBLY, AND STEAM TURBINE

(71) Applicant: MITSUBISHI HEAVY INDUSTRIES, LTD., Tokyo (JP)

(72) Inventors: Shunsuke Mizumi, Tokyo (JP); Soichiro Tabata, Yokohama (JP); Chongfei Duan, Tokyo (JP); Koji Ishibashi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/771,589

(22) PCT Filed: Dec. 11, 2020

(86) PCT No.: PCT/JP2020/046349
§ 371 (c)(1),
(2) Date: Apr. 25, 2022

(87) PCT Pub. No.: WO2021/117883
PCT Pub. Date: Jun. 17, 2021

(65) Prior Publication Data

US 2022/0381157 A1 Dec. 1, 2022

(30) Foreign Application Priority Data

Dec. 11, 2019 (JP) ................................ 2019-223560

(51) Int. Cl.
*F01D 25/32* (2006.01)
*F01D 9/04* (2006.01)
(Continued)

(52) U.S. Cl.
CPC ............ *F01D 25/32* (2013.01); *F01D 5/141* (2013.01); *F01D 9/041* (2013.01);
(Continued)

(58) Field of Classification Search
CPC .......... F01D 9/041; F01D 5/141; F01D 5/147; F01D 25/32; F05D 2240/122
See application file for complete search history.

(56) References Cited

U.S. PATENT DOCUMENTS 1,829,674 A * 10/1931 Rosenlocher .......... F01D 25/32 96/217
8,132,414 B2 * 3/2012 Niizeki .................. F01D 5/288 416/241 A
(Continued)

FOREIGN PATENT DOCUMENTS

EP 2692990 A2 * 2/2014 ............ F01D 25/32
JP 62-190803 12/1987
(Continued)

OTHER PUBLICATIONS

International Search Report dated Feb. 22, 2021 in International Application No. PCT/JP2020/046349, with English translation.
(Continued)

*Primary Examiner* — Brian Christopher Delrue
(74) *Attorney, Agent, or Firm* — Wenderoth, Lind & Ponack, L.L.P.

(57) ABSTRACT

This turbine stator vane extends in the radial direction which intersects the flow direction of steam, and includes a pressure surface facing the upstream side in the flow direction, and a suction surface facing the downstream side in the flow direction. A plurality of grooves are formed in at least the pressure surface, the grooves extending outward in the radial direction toward the downstream side. At the periphery of the grooves in the pressure surface, formed is a hydrophilic uneven region having greater hydrophilic properties than the pressure surface. The downstream-side ends of the plurality of grooves are connected to slits for capturing a liquified component of the steam.

11 Claims, 6 Drawing Sheets

(51) Int. Cl.
*F01D 5/04* (2006.01)
*F01D 5/14* (2006.01)

(52) U.S. Cl.
CPC .... *F05D 2220/31* (2013.01); *F05D 2240/123* (2013.01); *F05D 2260/602* (2013.01); *F05D 2300/51* (2013.01)

(56) References Cited

U.S. PATENT DOCUMENTS

| | | | | |
|---|---|---|---|---|
| 8,206,095 | B2 * | 6/2012 | Parker | F01D 5/14 416/193 A |
| 9,598,964 | B2 * | 3/2017 | Ishibashi | F01D 5/145 |
| 10,132,178 | B2 * | 11/2018 | Ishibashi | F01D 25/32 |
| 10,781,722 | B2 * | 9/2020 | Fandrei, II | B23K 26/0624 |
| 10,794,196 | B2 * | 10/2020 | Nakano | F01D 25/32 |
| 11,174,746 | B2 * | 11/2021 | Taniguchi | F01D 25/32 |
| 2007/0014670 | A1 * | 1/2007 | Maeno | B23P 15/04 416/232 |
| 2007/0101719 | A1 * | 5/2007 | Niizeki | F01D 5/288 60/645 |
| 2014/0030065 | A1 * | 1/2014 | Nakano | F01D 25/32 415/115 |
| 2015/0003969 | A1 | 1/2015 | Shibukawa et al. | |
| 2015/0110616 | A1 | 4/2015 | Stein et al. | |
| 2017/0167301 | A1 * | 6/2017 | Fandrei, II | B23K 26/0624 |
| 2022/0154585 | A1 * | 5/2022 | Mizumi | F01D 25/32 |

FOREIGN PATENT DOCUMENTS

| | | |
|---|---|---|
| JP | 63-183205 | 7/1988 |
| JP | 64-080705 | 3/1989 |
| JP | 4-095604 | 8/1992 |
| JP | 9-025803 | 1/1997 |
| JP | 10-299410 | 11/1998 |
| JP | 2007-309235 | 11/2007 |
| JP | 2013-155725 | 8/2013 |
| JP | 2015-010482 | 1/2015 |
| JP | 2015-081601 | 4/2015 |
| JP | 2016-166569 | 9/2016 |
| JP | 2017-20443 | 1/2017 |
| JP | 2017-106451 | 6/2017 |
| WO | WO-2020175192 A1 * | 9/2020 |
| WO | WO-2020175533 A1 * | 9/2020 |
| WO | WO-2020250596 A1 * | 12/2020 |
| WO | WO-2021117883 A1 * | 6/2021 |

OTHER PUBLICATIONS

Written Opinion of the International Searching Authority dated Feb. 22, 2021 in International Application No. PCT/JP2020/046349, with English translation.

* cited by examiner

TURBINE STATOR VANE, TURBINE STATOR VANE ASSEMBLY, AND STEAM TURBINE

TECHNICAL FIELD

The present disclosure relates to a turbine stator vane, a turbine stator vane assembly, and a steam turbine.

Priority is claimed on Japanese Patent Application No. 2019-223560, filed on Dec. 11, 2019, the content of which is incorporated herein by reference.

BACKGROUND ART

A steam turbine includes a rotary shaft that can rotate around an axis, a plurality of turbine rotor vane stages arrayed at an interval in an axial direction on an outer peripheral surface of the rotary shaft, a casing that covers a rotary shaft and the turbine rotor vane stages from an outer peripheral side, and a plurality of turbine stator vane stages arrayed alternately with the turbine rotor vane stages on an inner peripheral surface of the casing. A suction port for fetching steam from an outside is formed on an upstream side of the casing, and an exhaust port is formed on a downstream side. High-temperature and high-pressure steam fetched from the suction port is converted into a rotational force of the rotary shaft in the turbine rotor vane stage after a flow direction and a velocity are adjusted in the turbine stator vane stage.

The steam passing through the inside of the turbine loses energy from the upstream side to the downstream side, and a temperature (and a pressure) of the steam decreases. Therefore, in the turbine stator vane stage on a most downstream side, a portion of the steam is liquefied, and exists in an airflow as a fine water droplet. A portion of the water droplet adheres to a surface of the turbine stator vane. The water droplet quickly grows on a vane surface to form a liquid film. A periphery of the liquid film is always exposed to a high-speed steam flow. However, when the liquid film further grows to be thicker, a portion of the liquid film is torn by the steam flow, and is scattered in a state of a coarse liquid droplet. The scattered liquid droplet flows to the downstream side while being gradually accelerated by the steam flow. As the liquid droplet is larger, an inertial force increases. The liquid droplet rides on mainstream steam, cannot pass between the turbine rotor vanes, and collides with the turbine rotor vane. A peripheral speed of the turbine rotor vane may exceed a sound speed, in some cases. When the scattered liquid droplet collides with the turbine rotor vane, a surface of the turbine rotor vane may be eroded, thereby causing erosion. In addition, the collision of the liquid droplet may hinder rotation of the turbine rotor vane, thereby causing a braking loss.

In order to prevent adhesion and growth of this liquid droplet, various techniques have been proposed so far. For example, in the rotor vane disclosed in PTL 1 below, a guide groove or a guide rib for guiding the liquid droplet or the liquid film to the downstream side of the rotor vane is provided on a surface of the vane.

CITATION LIST

Patent Literature

[PTL 1] Japanese Unexamined Patent Application Publication No. 2016-166569

SUMMARY OF INVENTION

Technical Problem

Incidentally, the liquid droplet or the liquid film formed on a wall surface of the turbine stator vane is generated at a random position, regardless of a position of the guide groove or the guide rib disclosed in PTL 1 above. Furthermore, whereas the liquid droplet or the liquid film is moved due to a centrifugal force in the rotating turbine rotor vane, an external force is not generated in this way in the turbine stator vane which is a stationary body. Therefore, there is a possibility that the liquid droplet or the liquid film may not be sufficiently guided and removed simply by providing the guide groove or the guide rib.

The present disclosure is made to solve the above-described problems, and aims to provide a turbine stator vane, a turbine stator vane assembly, and a steam turbine which can effectively remove the liquid film by further reducing growth of a liquid film.

Solution to Problem

According to the present disclosure, in order to solve the above-described problems, there is provided a turbine stator vane including a pressure surface extending in a radial direction intersecting with a flow direction of steam, and facing an upstream side in the flow direction, and a suction surface facing a downstream side in the flow direction. A plurality of grooves extending outward in the radial direction toward the downstream side are formed on at least the pressure surface. A hydrophilic uneven region having a higher liquid film tolerance limit than that of the pressure surface is formed around the grooves on the pressure surface by being recessed in a depth direction intersecting with the pressure surface. An end portion on the downstream side of the plurality of grooves is connected to a slit that captures a liquefied component of the steam.

According to the present disclosure, there is provided a turbine stator vane assembly including a turbine stator vane including a pressure surface extending in a radial direction intersecting with a flow direction of steam, and facing an upstream side in the flow direction, and a suction surface facing a downstream side in the flow direction, and an outer peripheral ring provided in an outer end portion of the turbine stator vane in the radial direction. A plurality of grooves extending outward in the radial direction toward the downstream side are formed on at least the pressure surface. A ring groove connected to the groove and extending toward the downstream side along an inner peripheral surface of the outer peripheral ring is formed on the inner peripheral surface of the outer peripheral ring. An end portion on the downstream side of the plurality of grooves is connected to a slit that captures a liquefied component of the steam.

According to the present disclosure, there is provided a steam turbine including a turbine stator vane extending in a radial direction intersecting with a flow direction of steam, turbine rotor vane disposed with a gap on a downstream side of the turbine stator vane in the flow direction, and a turbine casing that covers the turbine stator vane and the turbine rotor vane from an outer peripheral side. The turbine stator vane includes a pressure surface facing an upstream side in the flow direction, and a suction surface facing a downstream side in the flow direction. A plurality of grooves extending outward in the radial direction toward the downstream side are formed on at least the pressure surface. A hydrophilic uneven region having higher hydrophilicity than that of the pressure surface is formed around the grooves on the pressure surface. An end portion on the downstream side of the plurality of grooves is connected to a gap serving as a slit that captures a liquefied component of the steam.

Advantageous Effects of Invention

According to the present disclosure, it is possible to provide a turbine stator vane and a turbine stator vane assembly which can effectively remove a liquid film by further reducing growth of the liquid film.

DESCRIPTION OF EMBODIMENTS

Figure 1:
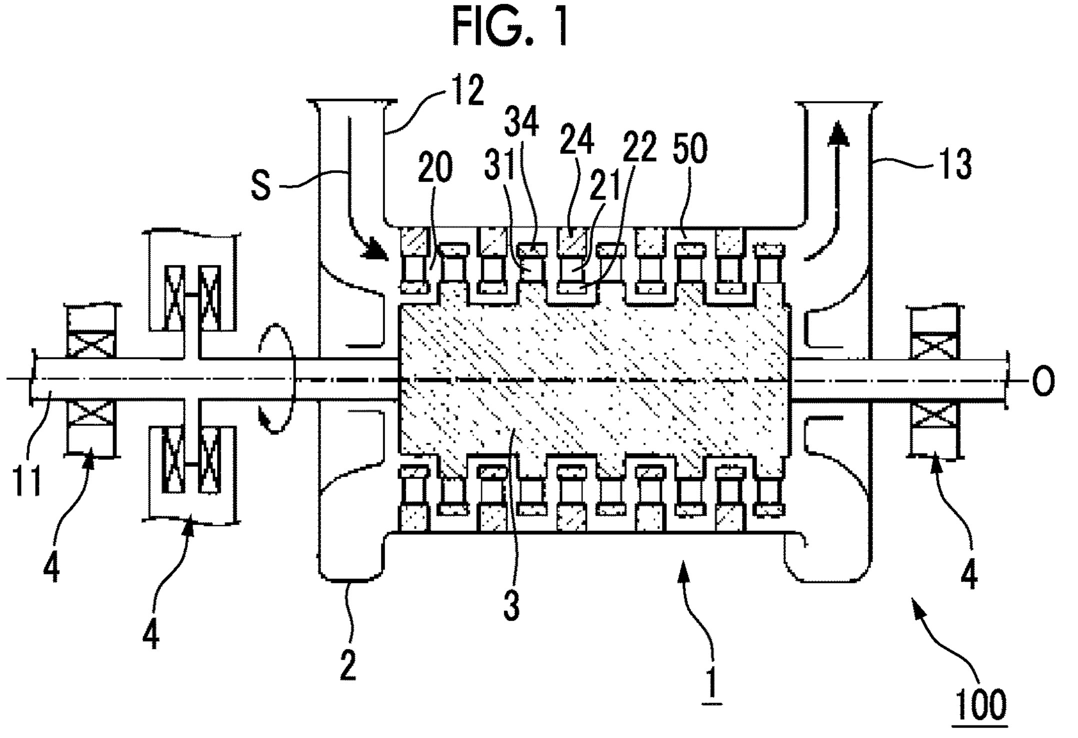
FIG. 1 is a schematic view illustrating a configuration of a steam turbine according to a first embodiment of the present disclosure.
Figure 2:
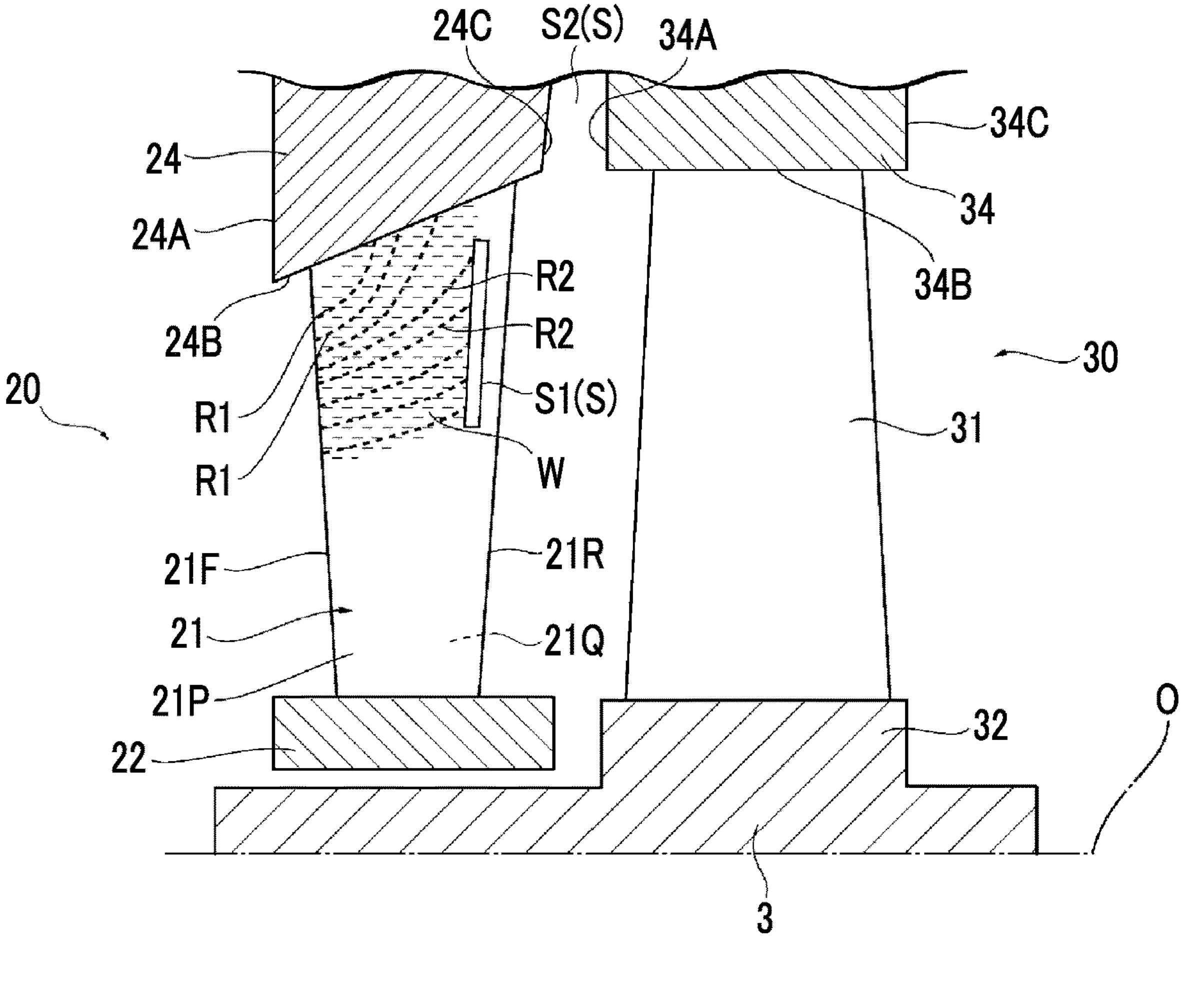
FIG. 2 is a view illustrating a configuration of a turbine stator vane assembly according to the first embodiment of the present disclosure.

First Embodiment (Configuration of Steam Turbine) A steam turbine 100 according to a first embodiment of the present disclosure will be described with reference to FIGS. 1 and 2. The steam turbine 100 according to the present embodiment includes a steam turbine rotor 1 that extends along a direction of an axis O, a steam turbine casing 2 that covers the steam turbine rotor 1 from an outer peripheral side, a journal bearing 4A that supports a shaft end 11 of the steam turbine rotor 1 to be rotatable around the axis O, and a thrust bearing 4B.

The steam turbine rotor 1 includes a rotary shaft 3 extending along the axis O and a plurality of rotor vanes 30 provided on an outer peripheral surface of the rotary shaft 3. The plurality of rotor vanes 30 are arrayed at a regular interval in a circumferential direction of the rotary shaft 3. Rows (rotor vane stages) of the plurality of the rotor vanes 30 are also arrayed at a regular interval in a direction of the axis O. The rotor vane 30 includes a rotor vane body 31 (turbine rotor vane) and a rotor vane shroud 34. The rotor vane body 31 protrudes outward in a radial direction from an outer peripheral surface of the steam turbine rotor 1. The rotor vane body 31 has a vane-shaped cross section when viewed in the radial direction. The rotor vane shroud 34 is provided in a tip portion (outer end portion in the radial direction) of the rotor vane body 31. A platform 32 is provided integrally with the rotary shaft 3 in a base end portion (inner end portion in the radial direction) of the rotor vane body 31 (refer to FIG. 2).

The steam turbine casing 2 has a substantially cylindrical shape that covers the steam turbine rotor 1 from an outer peripheral side. A steam supply pipe 12 for fetching steam S is provided on one side of the steam turbine casing 2 in the direction of the axis O. A steam discharge pipe 13 for discharging the steam S is provided on the other side of the steam turbine casing 2 in the direction of the axis O. The steam flows inside the steam turbine casing 2 from one side toward the other side in the direction of the axis O. In the following description, a direction in which the steam flows will be simply referred to as a "flow direction". Furthermore, a side where the steam supply pipe 12 is located when viewed from the steam discharge pipe 13 will be referred to as an upstream side in the flow direction, and a side where the steam discharge pipe 13 is located when viewed from the steam supply pipe 12 will be referred to as a downstream side in the flow direction.

A row of a plurality of stator vanes 20 (turbine stator vane assembly) is provided on an inner peripheral surface of the steam turbine casing 2. The stator vane 20 includes a stator vane body 21 (turbine stator vane), a stator vane shroud 22, and an outer peripheral ring 24. The stator vane body 21 is a vane-shaped member connected to an inner peripheral surface of the steam turbine casing 2 via the outer peripheral ring 24. Furthermore, the stator vane shroud 22 is provided in a tip portion (inner end portion in the radial direction) of the stator vane body 21. As in the rotor vanes 30, the plurality of stator vanes 20 are arrayed along the circumferential direction and the direction of the axis O on the inner peripheral surface. The rotor vanes 30 are disposed to enter a region between the plurality of stator vanes 20 adjacent to each other. That is, the stator vane 20 and the rotor vane 30 extend in a direction intersecting with the flow direction of the steam (radial direction with respect to the axis O).

The steam S is supplied into the steam turbine casing 2 configured as described above via the steam supply pipe 12 on the upstream side. While passing through the inside of the steam turbine casing 2, the steam S alternately passes through the stator vane 20 and the rotor vane 30. The stator vane 20 straightens a flow of the steam S, and a mass of the straightened steam S pushes the rotor vane 30 to apply a rotational force to the steam turbine rotor 1. The rotational force of the steam turbine rotor 1 is fetched from the shaft end 11, and is used to drive an external device (generator or the like). As the steam turbine rotor 1 rotates, the steam S is discharged toward a subsequent device (condenser or the like) through the steam discharge pipe 13 on the downstream side.

The journal bearing 4A supports a load acting in the radial direction with respect to the axis O. The journal bearings 4A are provided one by one in both ends of the steam turbine rotor 1. The thrust bearing 4B supports a load acting in the direction of the axis O. The thrust bearing 4B is provided only in an end portion on the upstream side of the steam turbine rotor 1.

(Configuration of Stator Vane Body) Next, a configuration of the stator vane body 21 will be described with reference to FIG. 2. The stator vane body 21 extends in the radial direction (radial direction with respect to the axis O) which is a direction intersecting with the flow direction. A cross section of the stator vane body 21 when viewed in the radial direction has a vane shape. More specifically, a leading edge 21F which is an end edge on the upstream side in the flow direction has a curved surface shape. A trailing edge 21R which is an end edge on the downstream side has a tapered shape so that a dimension in the circumferential direction gradually decreases when viewed in the radial direction. From the leading edge 21F to the trailing edge 21R, the stator vane body 21 is gently curved from one side toward the other side in the circumferential direction with respect to the axis O. In addition, the dimension of the stator vane body 21 in the direction of the axis O decreases inward in the radial direction. An outer peripheral ring 24 is attached to an outer end portion of the stator vane body 21 in the radial direction. The outer peripheral ring 24 has an annular shape formed around the axis O.

Out of respective surfaces of the outer peripheral ring 24, a surface facing the upstream side is a ring upstream surface 24A, a surface facing an inner peripheral side is a ring inner peripheral surface 24B, and a surface facing the downstream side is a ring downstream surface 24C. The ring upstream surface 24A and the ring downstream surface 24C spread in the radial direction with respect to the axis O. The dimension of the ring upstream surface 24A in the radial direction is larger than the dimension of the ring downstream surface 24C in the radial direction. In this manner, as an example in the present embodiment, the ring inner peripheral surface 24B gradually increases outward in the radial direction toward the downstream side.

The ring downstream surface 24C faces the rotor vane shroud 34 of the rotor vane 30 adjacent to the downstream side of the stator vane 20 with a gap S2. Out of respective surfaces of the rotor vane shroud 34, a surface facing the upstream side is a shroud upstream surface 34A, a surface facing the inner peripheral side is a shroud inner peripheral surface 34B, and a surface facing the downstream side is a shroud downstream surface 34C. That is, the above-described ring downstream surface 24C faces the shroud upstream surface 34A with a gap. The gap S2 is a portion of a slit S for capturing a liquid droplet (to be described later).

Out of a pair of surfaces facing the circumferential direction in the stator vane body 21, a surface facing the upstream side is a pressure surface 21P, and a surface facing the downstream side is a suction surface 21Q. Out of the pressure surface 21P and the suction surface 21Q, a plurality of grooves R1 and R2, and a hollow slit S1 serving as a portion of the above-described slit S are formed on at least the pressure surface 21P. The grooves R1 and R2 are provided to capture and guide the liquid droplet (water droplet) generated on the pressure surface 21P. Both the grooves R1 and R2 are recessed from the pressure surface 21P in a vane thickness direction, and extend outward in the radial direction toward the downstream side.

In the grooves R1 and R2, an outer end portion of the groove R1 in the radial direction may extend to an inner peripheral surface (ring inner peripheral surface 24B) of the outer peripheral ring 24, and an inner end portion in the radial direction may extend to the leading edge 21F. On the other hand, the groove R2 extends to the hollow slit S1 from the leading edge 21F. The hollow slit S1 is formed in the vicinity of the end portion (that is, the trailing edge 21R) on the downstream side on the pressure surface 21P, extends in the radial direction, and is recessed in the vane thickness direction. In the present embodiment, three grooves R1 and five grooves R2 are formed. However, the number of the grooves R1 and R2 is not limited to an example in the present embodiment, and can be appropriately changed in accordance with a design or specifications.

Figure 3:
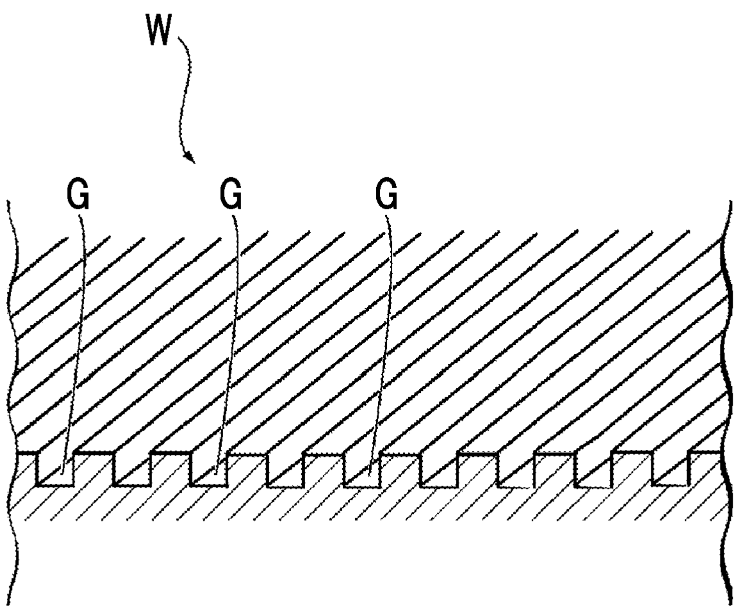
FIG. 3 is a perspective view illustrating an example of a hydrophilic uneven region according to the first embodiment of the present disclosure.

A hydrophilic uneven region W is formed around the grooves R1 and R2 on the pressure surface 21P. That is, the pressure surface 21P has the above-described hydrophilic uneven region W and a main pressure surface region other than the hydrophilic uneven region W. As illustrated in a sectional view as an example in FIG. 3, the hydrophilic uneven region W is formed by a large number of fine grooves G recessed in a depth direction intersecting with the pressure surface 21P. In this manner, in the hydrophilic uneven region W, a liquid film tolerance limit is larger than that of the pressure surface 21P itself which is not processed. The "liquid film tolerance limit" described herein indicates a permeation amount and a holding amount of the liquid film with respect to the region. That is, the hydrophilic uneven region W has higher hydrophilicity than that of other regions. In addition to fine processing (forming the groove G) as described above, the hydrophilicity can also be realized by coating or the like. In addition, the permeation amount and the holding amount are determined by porosity in the region. The inner surfaces of the grooves R1 and R2 are not subjected to this hydrophilic processing. Here, a width of the hollow slit S1 is generally set to a millimeter order of approximately 1 mm to 2 mm, and a width of the grooves R1 and R2 on the pressure surface 21P is generally set to a sub-millimeter order of approximately several hundred μm to 1 mm per one groove, and a width of each fine groove G is generally set to a micron order of several μm to several tens of μm per one groove.

(Operational Effect)

Subsequently, a behavior of the steam in the stator vane 20 (stator vane body 21) according to the present embodiment will be described. A temperature of the steam passing through the inside of the steam turbine casing 2 decreases as the steam works from the upstream side to the downstream side. Therefore, in a turbine stator vane stage on a most downstream side, a portion of the steam is liquefied, and adheres to a surface of the stator vane body as the liquid droplet (water droplet). The liquid droplet gradually grows to form a liquid film. When the liquid film further grows, a portion of the liquid film is torn, and is scattered as a coarse liquid droplet. The scattered liquid droplet rides on a mainstream of the steam, and tries to flow to the downstream side. However, the coarse liquid droplet cannot sufficiently ride on the mainstream due to a large inertial force acting on itself, and collides with the turbine rotor vane (rotor vane body 31). A peripheral speed of the turbine rotor vane may exceed a sound speed, in some cases. When the scattered liquid droplet collides with the turbine rotor vane, a surface of the turbine rotor vane may be eroded, thereby causing erosion. In addition, the collision of the liquid droplet may hinder rotation of the turbine rotor vane, thereby causing a braking loss.

However, according to the above-described configuration, the liquid droplet formed on the pressure surface 21P or the suction surface 21Q is collected toward the grooves R1 and R2, thereby forming a liquid vein. The liquid vein flows along the grooves R1 and R2 by being exposed to a flow of the steam. Thereafter, the liquid vein passing through the grooves R1 and R2 is captured by the slit S, and is discharged outward. Specifically, the liquid vein passing through the groove R1 flows to the downstream side along the inner peripheral surface (ring inner peripheral surface 24B) of the outer peripheral ring 24, and thereafter, flows into the gap S2 between the outer peripheral ring 24 and the rotor vane shroud 34. On the other hand, the liquid vein passing through the groove R2 flows into the gap S2 by the hollow slit S1. In this manner, it is possible to reduce a possibility that the liquid droplet or the liquid film may grow on the surface (pressure surface 21P or suction surface 21Q) of the stator vane body 21.

Furthermore, in the above-described configuration, the hydrophilic uneven region W is formed around the grooves R1 and R2. In the hydrophilic uneven region W, tension between water and a wall surface is strengthened by performing the above-described fine processing on the groove G, coating, or the like. In this manner, the liquid film tends to spread over the whole hydrophilic uneven region W. That is, the thickness of the liquid film in the region can be reduced. The liquid film on a vane surface is swept away by an airflow inside the turbine. However, a flow velocity of the airflow becomes slower as the airflow is closer to the wall surface. Therefore, the flow velocity of the airflow acting on the thin liquid film is slower than that of the airflow acting on the thick liquid film. That is, as the liquid film is thinner, a moving speed of the liquid film is slower. In addition, the hydrophilic uneven region W is processed on the vane surface. In this manner, even when the vane surface has the same area, a surface area in contact with the liquid film increases, and friction between the vane surface and the liquid film increases. In this manner, it is possible to increase flow resistance. As a result, it is possible to reduce a possibility that the liquid film may ride across the grooves R1 and R2 and may flow away to the downstream side. In other words, the grooves R1 and R2 can more stably capture the liquid film.

According to the above-described configuration, the hollow slit S1 serving as the slit S is formed in a portion on the downstream side on at least the pressure surface 21P. In this manner, the liquid film formed on the pressure surface 21P can be guided by the groove R2, and thereafter, can be immediately captured by the hollow slit S1. As a result, it is possible to further reduce a possibility that the liquid film may be scattered on the downstream side.

According to the above-described configuration, the liquid film formed on the pressure surface 21P can be guided by the groove R1, and thereafter, can be immediately captured by the gap S2 serving as the slit S. The gap S2 is a gap between the stator vane 20 and the rotor vane 30. Therefore, compared to a case where only the hollow slit S1 is formed in the stator vane body 21, more liquid veins can be captured. In this manner, it is possible to further reduce the possibility that the liquid film may be scattered on the downstream side.

In addition, according to the above-described configuration, the plurality of grooves R1 and R2 are respectively formed. Therefore, the liquid droplet can be captured and guided in a wider range.

Hitherto, the first embodiment of the present disclosure has been described. The above-described configurations can be changed or modified in various ways as long as the change or the modification does not depart from the concept of the present disclosure.

Second Embodiment

Figure 4:
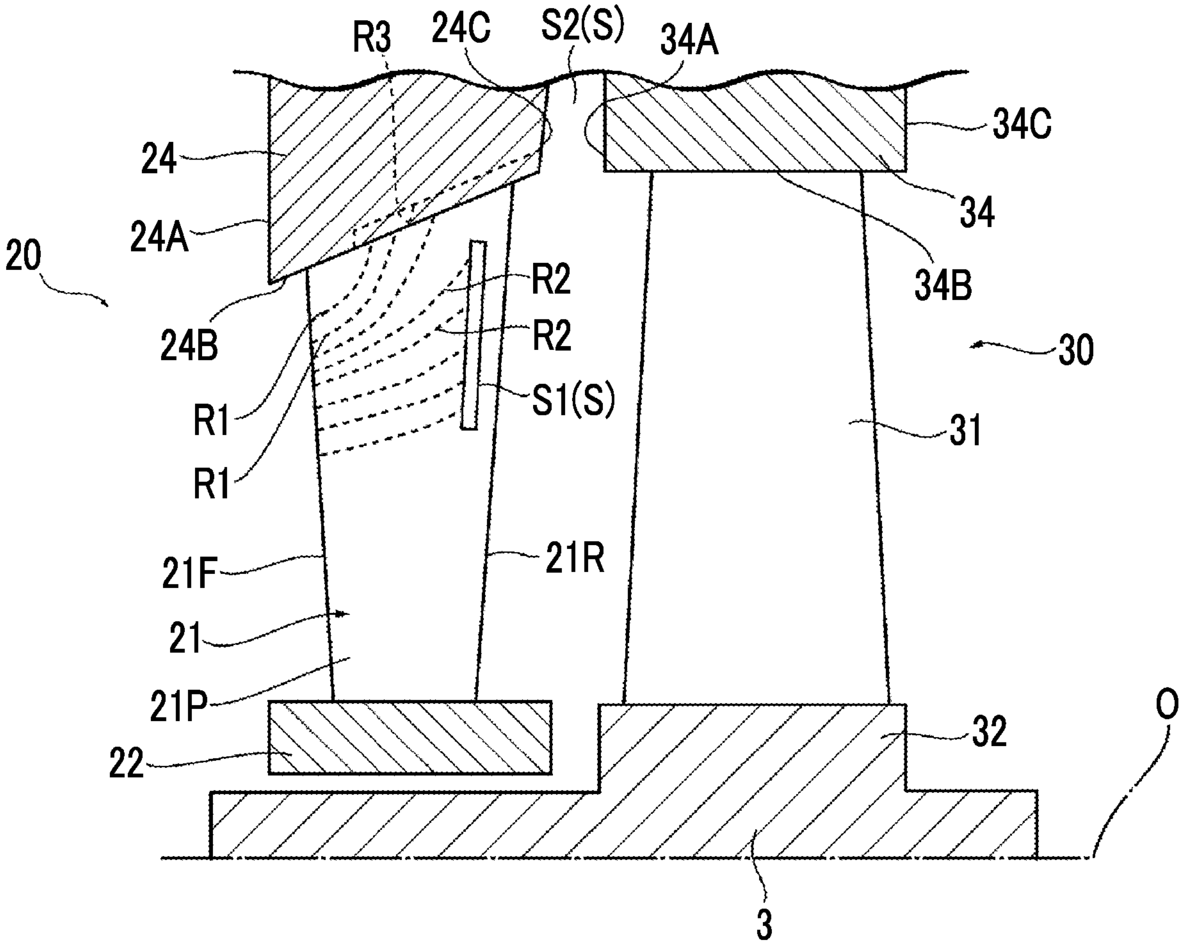
FIG. 4 is a view illustrating a configuration of a turbine stator vane assembly according to a second embodiment of the present disclosure.

Subsequently, a second embodiment of the present disclosure will be described with reference to FIGS. 4 to 6. The same reference numerals will be assigned to configurations which are the same as those in the above-described first embodiment, and detailed description thereof will be omitted. As illustrated in FIG. 4, in the present embodiment, the above-described hydrophilic uneven region W is not formed in the stator vane body 21. On the other hand, in addition to the grooves R1 and R2, another ring groove R3 is formed on the outer peripheral ring 24.

Figure 7:
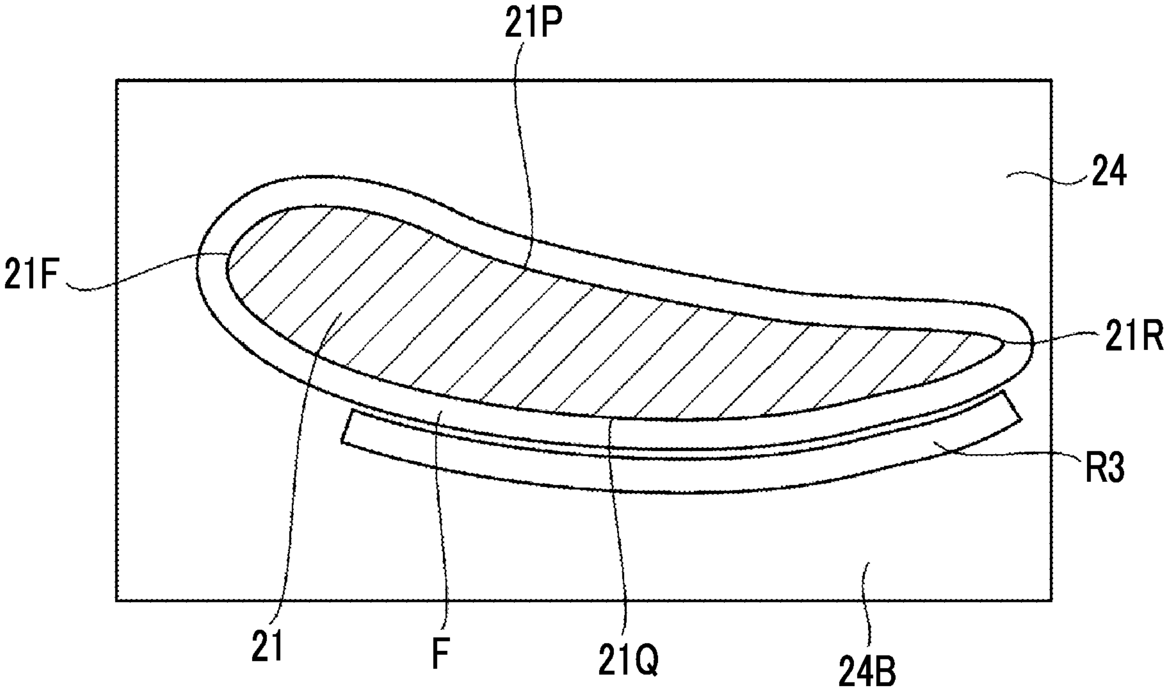
FIG. 7 is a sectional view when a modification example of the turbine stator vane assembly according to the second embodiment of the present disclosure is viewed in the radial direction.
Figure 8:
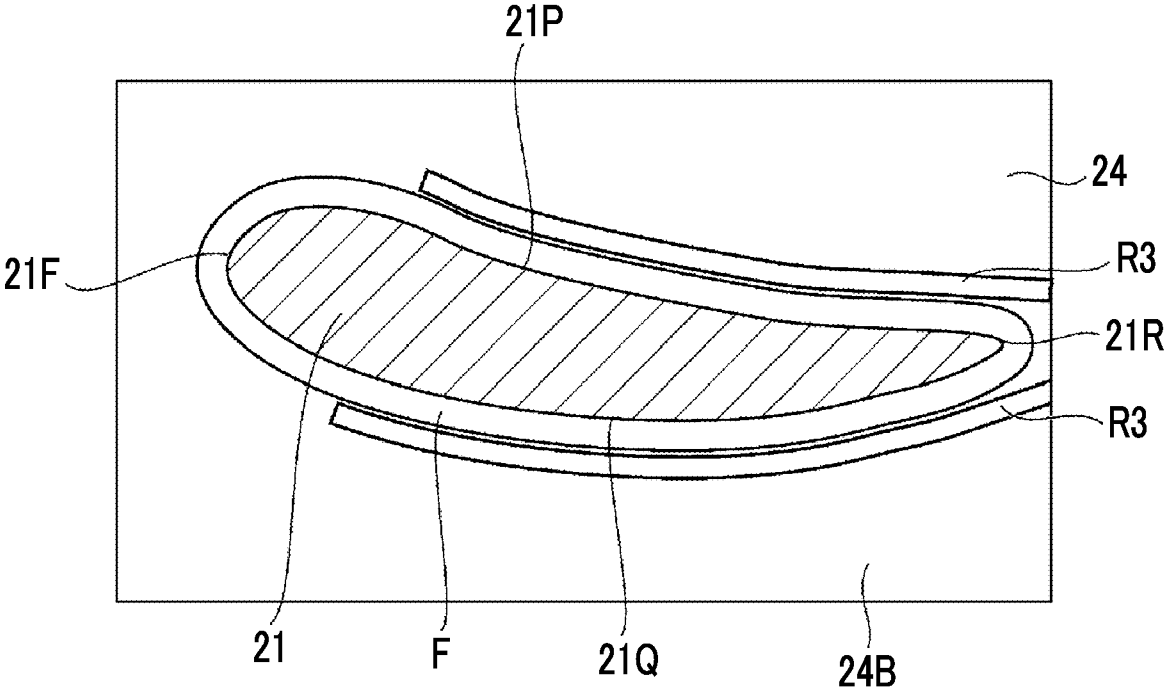
FIG. 8 is a sectional view when another modification example of the turbine stator vane assembly according to the second embodiment of the present disclosure is viewed in the radial direction.
Figure 10:
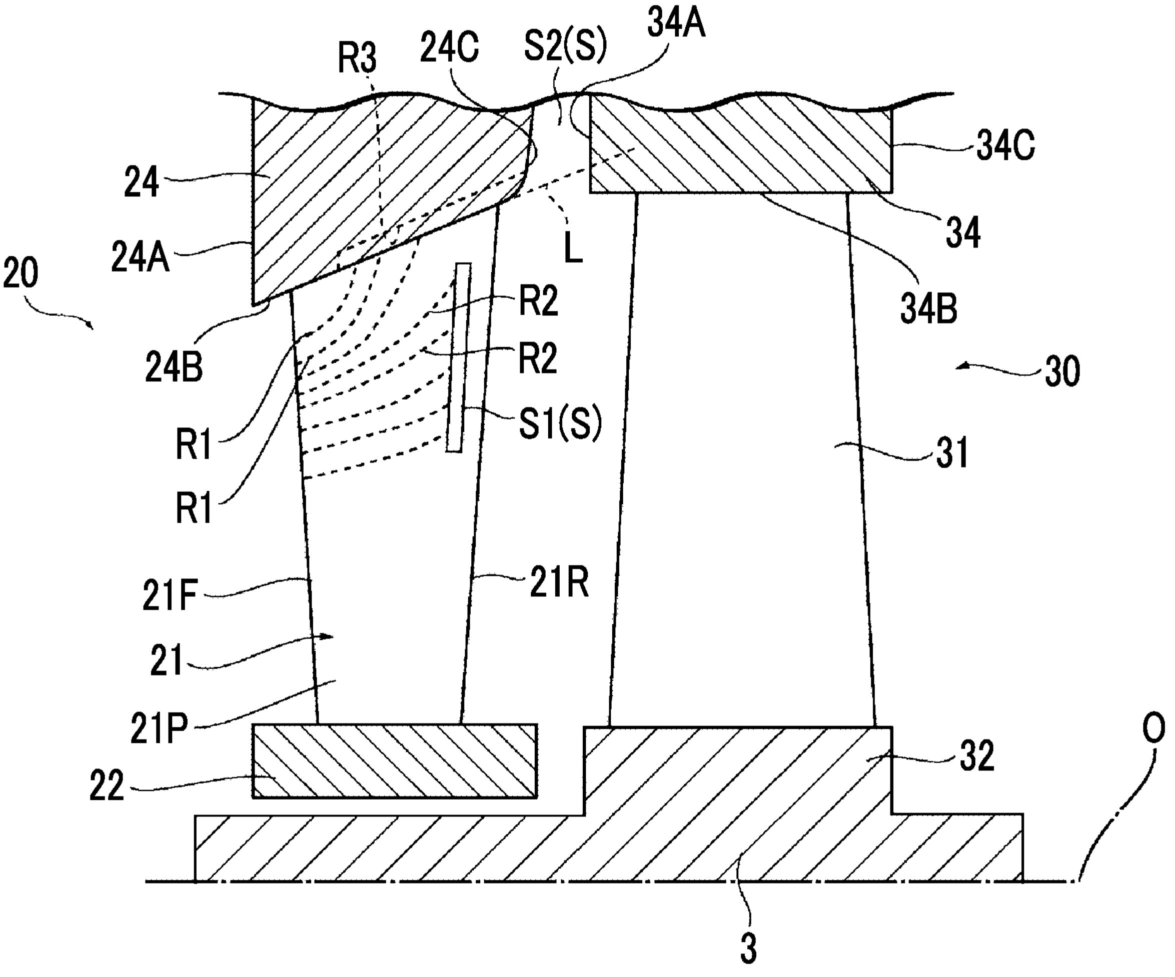
FIG. 10 is a view illustrating a modification example of the turbine stator vane assembly according to the third embodiment of the present disclosure.

The ring groove R3 extends to the downstream side along a shape of the pressure surface 21P on the ring inner peripheral surface 24B, and is connected to an outer end portion in the radial direction of the groove R1 formed on the pressure surface 21P. In examples in FIGS. 4 and 5, a starting point of the ring groove R3 is provided at a position biased to the leading edge 21F side on the pressure surface 21P. In addition, as illustrated in FIG. 6, the ring groove R3 has a rectangular shape in a sectional view. A cross-sectional shape of the ring groove R3 is not limited to the rectangular shape, and may be a recessed curved surface shape having no corner portion (in this case, concentration of local stress can be suppressed, compared to the rectangular shape). As illustrated in FIG. 7, the ring groove R3 may be provided not only on the pressure surface 21P side, but also on the suction surface 21Q side together with the grooves R1 and R2. In an example in FIG. 7, an end portion on the downstream side of the ring groove R3 does not reach a downstream end (slit S2) of the inner peripheral surface 24B. However, the reason is as follows. As will be described in [Modification Example] (to be described later), a portion including the end portion on the downstream side on the inner peripheral surface (ring inner peripheral surface 24B) of the outer peripheral ring is curved outward in the radial direction from the upstream side toward the downstream side as illustrated in FIG. 10. In addition, as illustrated in FIG. 8, the ring grooves R3 may be respectively provided on both sides of the pressure surface 21P and the suction surface 21Q.

Figure 5:
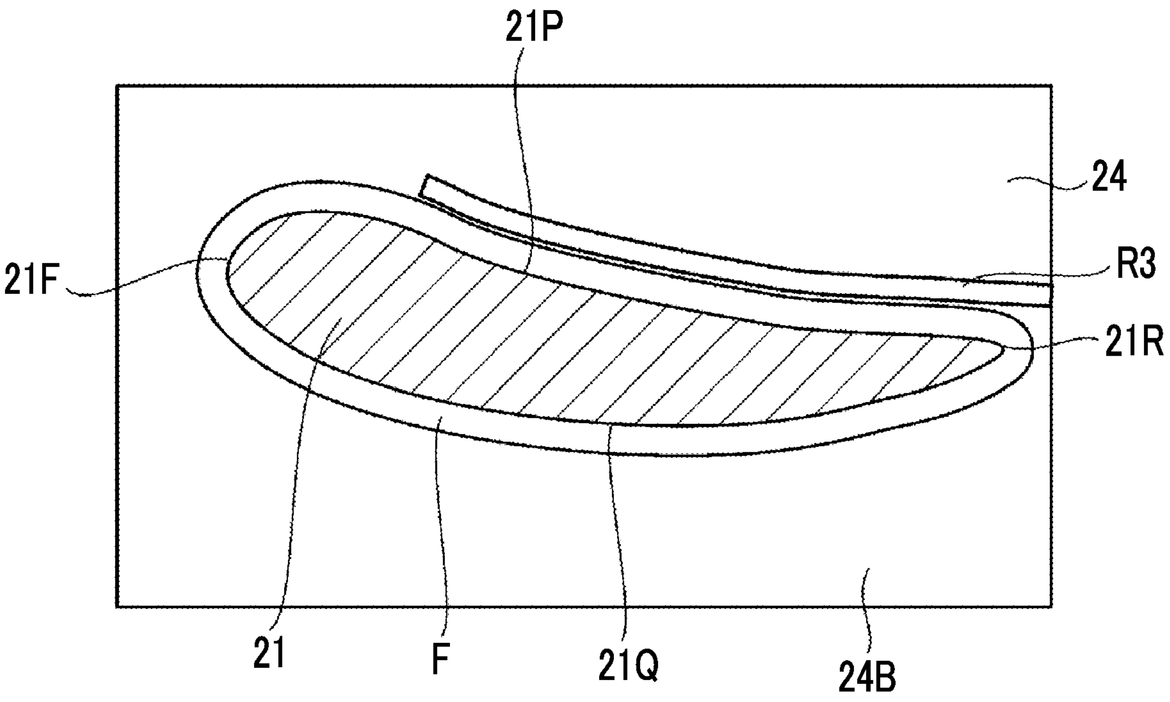
FIG. 5 is a sectional view when the turbine stator vane assembly according to the second embodiment of the present disclosure is viewed in a radial direction.
Figure 6:
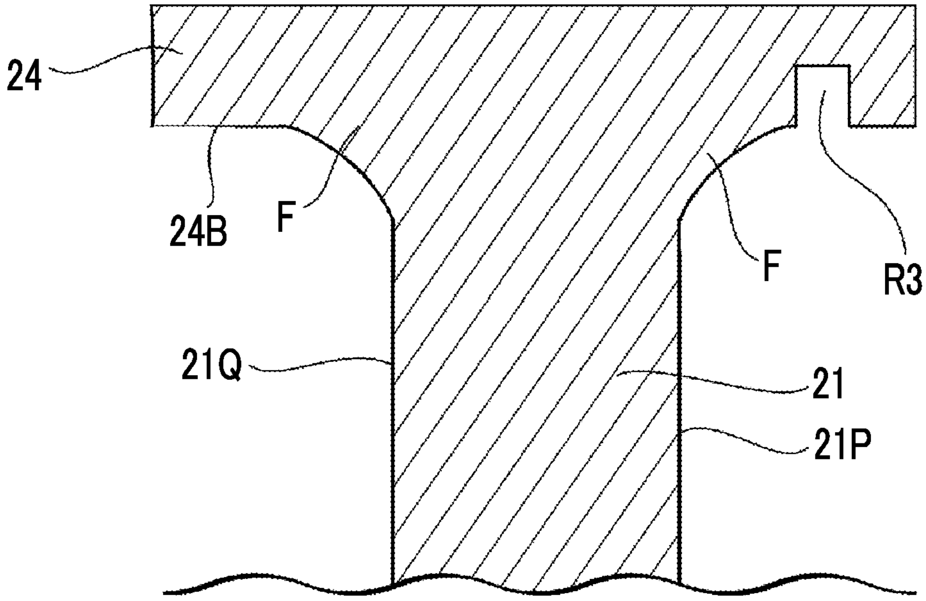
FIG. 6 is a sectional view when the turbine stator vane assembly according to the second embodiment of the present disclosure is viewed in a chord direction.

Here, as illustrated in FIG. 5 or FIG. 6, a fillet portion F that connects the stator vane body 21 and the ring inner peripheral surface 24B is provided between the stator vane body 21 and the ring inner peripheral surface 24B. The fillet portion F is curved in a direction away from the stator vane body 21 from the stator vane body 21 side toward the ring inner peripheral surface 24B side. That is, the fillet portion F has a curved surface shape recessed toward the stator vane body 21 side. Accordingly, the stator vane body 21 and the ring inner peripheral surface 24B are smoothly connected to each other. The above-described ring groove R3 is formed on the ring inner peripheral surface 24B side from the fillet portion F. In other words, the ring groove R3 is formed in the vicinity thereof not to overlap the fillet portion F and to follow extension of the fillet portion F.

According to the above-described configuration, the liquid droplet formed on the pressure surface 21P or the suction surface 21Q is collected toward the grooves R1 and R2, thereby forming the liquid vein. The liquid vein flows along the grooves R1 and R2 by being exposed to a flow of the steam. In the grooves R1 and R2, thereafter, the liquid vein passing through the groove R1 flows into the ring groove R3. The liquid vein flowing into the ring groove R3 is captured by the gap S2 serving as the slit S, and is discharged outward. In this manner, it is possible to reduce a possibility that the liquid droplet or the liquid film may grow on the surface (pressure surface 21P or suction surface 21Q) of the stator vane body 21.

Furthermore, according to the above-described configuration, the ring groove R3 is formed on the ring inner peripheral surface 24B side from the fillet portion F. That is, the ring groove R3 can be formed without changing a shape of the fillet portion F. In this manner, the liquid vein can be stably guided while suppressing a decrease in strength of the fillet portion F.

In addition, according to the above-described configuration, the starting point of the ring groove R3 is provided at a position biased to the leading edge 21F side on the pressure surface 21P. In this manner, for example, compared to a case where the starting point is provided by being biased to the trailing edge 21R side, the liquid vein can be guided early to the ring groove R3 in a stage before growth at a position biased to the leading edge 21F side.

Hitherto, the second embodiment of the present disclosure has been described. The above-described configurations can be changed or modified in various ways as long as the change or the modification does not depart from the concept of the present disclosure.

Third Embodiment

Figure 9:
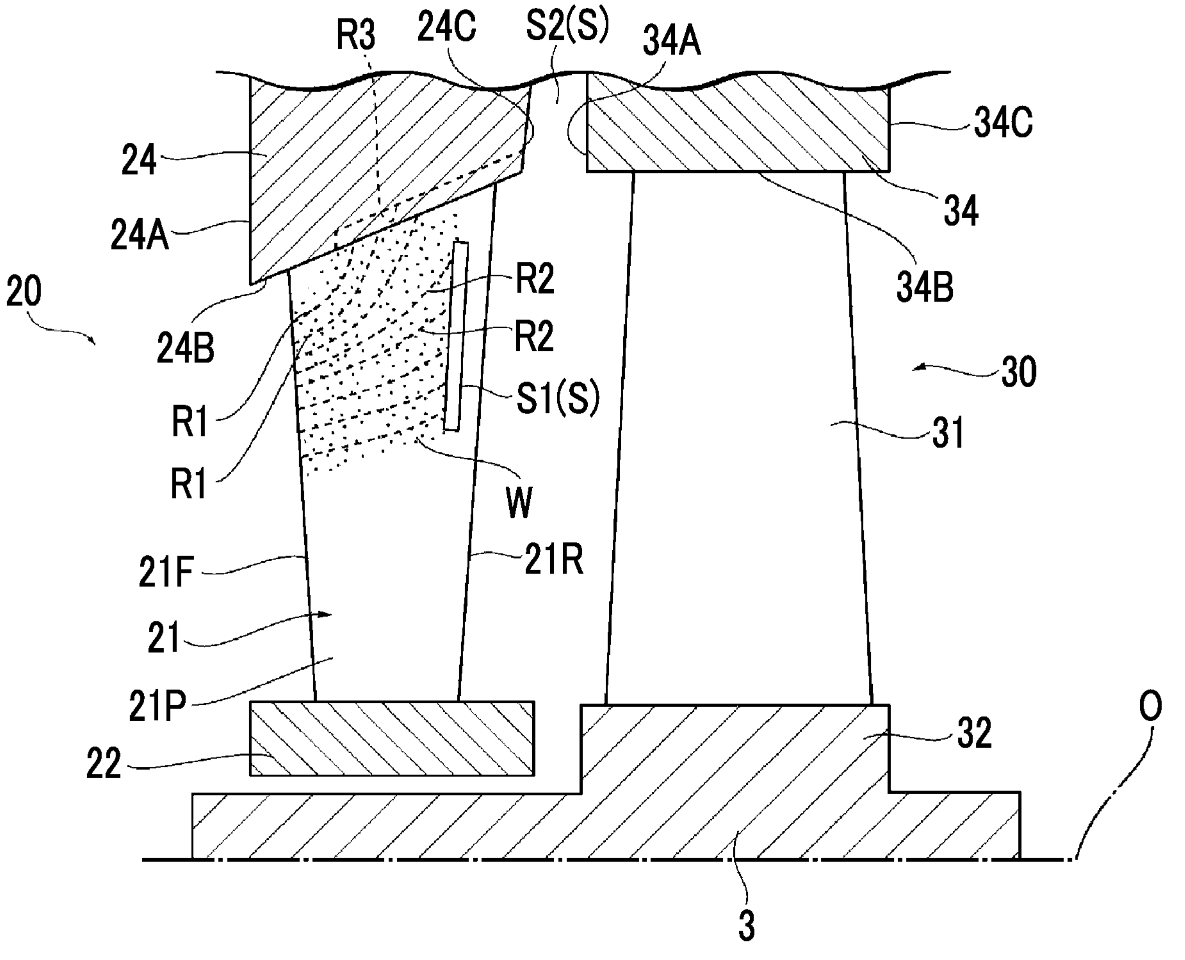
FIG. 9 is a view illustrating a configuration of a turbine stator vane assembly according to a third embodiment of the present disclosure.

Next, a third embodiment of the present disclosure will be described with reference to FIG. 9. The same reference numerals will be assigned to configurations which are the same as those in each of the above-described embodiments, and detailed description thereof will be omitted. As illustrated in the drawing, in the present embodiment, the hydrophilic uneven region W described in the first embodiment is provided in the stator vane body 21, and the ring groove R3 described in the second embodiment is formed in the outer peripheral ring 24. That is, in the present embodiment, the respective configurations of the first embodiment and the second embodiment are used in combination. According to this configuration, all of operational effects described in the respective embodiments can be obtained. As a result, it is possible to further reduce the growth of the liquid film in the stator vane 20.

Modification Example

In the second embodiment or the third embodiment described above, the portion including the end portion on the downstream side on the inner peripheral surface (ring inner peripheral surface 24B) of the outer peripheral ring 24 may be curved outward in the radial direction from the upstream side toward the downstream side as illustrated in FIG. 10. According to this configuration, the liquid droplet can be smoothly guided along a downstream end of the ring inner peripheral surface 24B which is curved outward in the radial direction, and can reach the gap S2 serving as the slit S. In addition, even when the liquid droplet is scattered from the curved portion and is not captured by the slit S2, the liquid droplet collides with the shroud upstream surface 34A which is a stationary member, instead of the tip side of the turbine rotor vane 31 rotating at a high peripheral speed with respect to a vehicle interior. Therefore, it is possible to reduce a possibility that erosion may occur in the turbine rotor vane 31.

In addition, in the third embodiment described above, in a sectional view including the axis O, an extension line (broken line L in FIG. 10) formed by extending the inner peripheral surface (ring inner peripheral surface 24B) of the outer peripheral ring 24 to the downstream side may intersect with the shroud upstream surface 34A facing the turbine rotor vane 31 located on the downstream side in the radial direction. According to this configuration, even when a portion of the liquid droplet is not captured from the ring groove R3 by the slit S2 and is scattered from the ring inner peripheral surface 24B to the turbine rotor vane side, the liquid droplet collides with the shroud upstream surface 34A instead of the turbine rotor vane 31. Therefore, it is possible to further reduce the possibility that the erosion may occur in the turbine rotor vane 31.

Additional Notes

The turbine stator vane and the turbine stator vane assembly which are described in the respective embodiments are understood as follows, for example.

(1) According to a first aspect, the turbine stator vane 21 includes the pressure surface 21P extending in the radial direction intersecting with the flow direction of the steam, and facing the upstream side in the flow direction, and the suction surface 21Q facing the downstream side in the flow direction. The plurality of grooves R1 and R2 extending outward in the radial direction toward the downstream side are formed on at least the pressure surface 21P. The hydrophilic uneven region W is recessed in the depth direction intersecting with the pressure surface 21P to have the higher liquid film tolerance limit than that of the pressure surface 21P is formed around the grooves R1 and R2 on the pressure surface 21P. The end portion on the downstream side of the plurality of grooves R1 and R2 is connected to the slit S that captures the liquefied component of the steam.

According to the above-described configuration, the liquid droplet formed on the pressure surface 21P or the suction surface 21Q is collected toward the grooves R1 and R2, thereby forming the liquid vein. The liquid vein flows along the grooves R1 and R2 by being exposed to a flow of the steam. Thereafter, the liquid vein passing through the grooves R1 and R2 is captured by the slit S, and is discharged outward. In this manner, it is possible to reduce a possibility that the liquid droplet or the liquid film may grow on the surface (pressure surface 21P or suction surface 21Q) of the turbine stator vane 21.

Furthermore, in the above-described configuration, the hydrophilic uneven region W is formed around the grooves R1 and R2. In this manner, the thickness of the liquid film in the region can be decreased, and the flow resistance can be increased. As a result, it is possible to reduce a possibility that the liquid film may ride across the grooves R1 and R2 and may flow away to the downstream side. In other words, the grooves R1 and R2 can more stably capture the liquid film.

(2) According to a second aspect, in the turbine stator vane 21, the slit S is the hollow slit S1 formed on the downstream side on at least the pressure surface 21P, and extending in the radial direction.

According to the above-described configuration, the hollow slit S1 is formed in the portion on the downstream side on at least the pressure surface 21P. In this manner, the liquid film formed on the pressure surface 21P can be guided by the groove R2, and thereafter, can be immediately captured by the hollow slit S1. As a result, it is possible to further reduce a possibility that the liquid film may be scattered on the downstream side.

(3) According to a third aspect, the turbine stator vane 21 includes the plurality of the grooves R1 and R2.

According to the above-described configuration, the plurality of grooves R1 and R2 are formed. Therefore, the liquid droplet can be captured and guided in a wider range.

(4) According to a fourth aspect, there is provided the turbine stator vane assembly 20. The turbine stator vane assembly 20 includes the turbine stator vane 21 according to any one of the above-described aspects, and the outer peripheral ring 24 provided in the outer end portion of the turbine stator vane 21 in the radial direction. The ring groove R3 connected to the groove R1 and extending toward the downstream side along the inner peripheral surface 24B of the outer peripheral ring 24 is formed on the inner peripheral surface 24B of the outer peripheral ring 24.

According to the above-described configuration, the liquid droplet formed on the pressure surface 21P or the suction surface 21Q is collected toward the groove R1, thereby forming the liquid vein. The liquid vein flows along the groove R1 by being exposed to the flow of the steam. Thereafter, the liquid vein passing through the groove R1 flows into the ring groove R3. The liquid vein flowing into the ring groove R3 is captured by the slit S, and is discharged outward. In this manner, it is possible to reduce a possibility that the liquid droplet or the liquid film may grow on the surface (pressure surface 21P or suction surface 21Q) of the turbine stator vane 21.

(5) According to a fifth aspect, in the turbine stator vane assembly 20, the starting point of the ring groove R3 is provided at the position biased to the leading edge 21F side of the pressure surface 21P.

According to the above-described configuration, the liquid vein can be guided early to the ring groove R3 from the position biased to the leading edge 21F side on the pressure surface 21P.

(6) According to a sixth aspect, the turbine stator vane assembly 20 further includes the fillet portion F that connects the turbine stator vane 21 and the inner peripheral surface 24B, and is curved from the turbine stator vane 21 side toward the inner peripheral surface 24B side. The ring groove R3 is formed on the inner peripheral surface 24B side from the fillet portion F.

According to the above-described configuration, the ring groove R3 is formed on the inner peripheral surface 24B side from the fillet portion F. That is, the ring groove R3 can be formed without changing a shape of the fillet portion F. In this manner, the liquid vein can be stably guided while suppressing a decrease in strength of the fillet portion F.

(7) According to a seventh aspect, in the turbine stator vane 21, the slit S is the hollow slit S1 formed on the downstream side on at least the pressure surface 21P, and extending in the radial direction.

According to the above-described configuration, the hollow slit S1 is formed in the portion on the downstream side on at least the pressure surface 21P. In this manner, the liquid film formed on the pressure surface 21P can be guided by the groove R2, and thereafter, can be immediately captured by the hollow slit S1. As a result, it is possible to further reduce a possibility that the liquid film may be scattered on the downstream side.

(8) According to an eighth aspect, there is provided the turbine stator vane assembly 20. The turbine stator vane assembly 20 includes the turbine stator vane 21 having the pressure surface 21P extending in the radial direction intersecting with the flow direction of the steam, and facing the upstream side in the flow direction, and the suction surface 21Q facing the downstream side in the flow direction, and the outer peripheral ring 24 provided in the outer end portion of the turbine stator vane 21 in the radial direction. The plurality of grooves R1 extending outward in the radial direction toward the downstream side are formed on at least the pressure surface 21P. The ring groove R3 connected to the groove R1 and extending toward the downstream side along an inner peripheral surface 24B of the outer peripheral ring 24 is formed on the inner peripheral surface 24B of the outer peripheral ring 24. The end portion on the downstream side of the plurality of grooves R1 is connected to the slit S that captures the liquefied component of the steam.

According to the above-described configuration, the liquid droplet formed on the pressure surface 21P or the suction surface 21Q is collected toward the groove R1, thereby forming the liquid vein. The liquid vein flows along the groove R1 by being exposed to the flow of the steam. Thereafter, the liquid vein passing through the groove R1 flows into the ring groove R3. The liquid vein flowing into the ring groove R3 is captured by the slit S, and is discharged outward. In this manner, it is possible to reduce a possibility that the liquid droplet or the liquid film may grow on the surface (pressure surface 21P or suction surface 21Q) of the turbine stator vane 21.

(9) According to a ninth aspect, in the turbine stator vane assembly 20, the starting point of the ring groove R3 is provided at the position biased to the leading edge 21F side on the pressure surface 21P.

According to the above-described configuration, the liquid vein can be guided early to the ring groove R3 from the position biased to the leading edge 21F side on the pressure surface 21P.

(10) According to a tenth aspect, the turbine stator vane assembly 20 further includes the fillet portion F that connects the turbine stator vane 21 and the inner peripheral surface 24B, and is curved from the turbine stator vane 21 side toward the inner peripheral surface 24B side. The ring groove R3 is formed on the inner peripheral surface 24B side from the fillet portion F.

According to the above-described configuration, the ring groove R3 is formed on the inner peripheral surface 24B side from the fillet portion F. That is, the ring groove R3 can be formed without changing a shape of the fillet portion F. In this manner, the liquid vein can be stably guided while suppressing a decrease in strength of the fillet portion F.

(11) According to an eleventh aspect, in the turbine stator vane assembly 20, the slit S is the hollow slit S1 formed on the downstream side on at least the pressure surface 21P, and extending in the radial direction.

According to the above-described configuration, the hollow slit S1 is formed in the portion on the downstream side on at least the pressure surface 21P. In this manner, the liquid film formed on the pressure surface 21P can be guided by the groove R2, and thereafter, can be immediately captured by the hollow slit S1. As a result, it is possible to further reduce a possibility that the liquid film may be scattered on the downstream side.

(12) In the turbine stator vane assembly 20 according to the twelfth aspect, the portion including the end portion on the downstream side on the inner peripheral surface of the outer peripheral ring 24 is curved outward in the radial direction from the upstream side toward the downstream side.

According to the above-described configuration, the liquid droplet can be smoothly guided along the ring inner peripheral surface 24B curved outward in the radial direction, and can reach the gap S2 serving as the slit S. In addition, even when the liquid droplet is scattered from the curved portion and is not captured by the slit S2, the liquid droplet collides with the shroud upstream surface 34A which is a stationary member, instead of the tip side of the turbine rotor vane 31 rotating at a high peripheral speed with respect to a vehicle interior. Therefore, it is possible to reduce a possibility that erosion may occur in the turbine rotor vane 31.

(13) According to a thirteenth aspect, in the turbine stator vane assembly 20, in the sectional view including the axis O, the extension line L formed by extending the inner peripheral surface (ring inner peripheral surface 24B) of the outer peripheral ring 24 to the downstream side intersects with the shroud upstream surface 34A facing the turbine rotor vane 31 located on the downstream side in the radial direction.

According to the above-described configuration, even when a portion of the liquid droplet is not captured from the ring groove R3 by the slit S2 and is scattered from the ring inner peripheral surface 24B to the turbine rotor vane side, the liquid droplet collides with the shroud upstream surface 34A instead of the turbine rotor vane 31. Therefore, it is possible to further reduce the possibility that the erosion may occur in the turbine rotor vane 31.

(14) According to a fourteenth aspect, there is provided the steam turbine 100 including the turbine stator vane 21 extending in the radial direction intersecting with the flow direction of the steam, the turbine rotor vane 31 disposed with a gap S2 on the downstream side of the turbine stator vane 21 in the flow direction, and the turbine casing 2 that covers the turbine stator vane 21 and the turbine rotor vane 31 from the outer peripheral side. The turbine stator vane 21 has the pressure surface 21P facing the upstream side in the flow direction, and the suction surface 21Q facing the downstream side in the flow direction. The plurality of grooves R1 and R2 extending outward in the radial direction toward the downstream side are formed on at least the pressure surface 21P. The hydrophilic uneven region W having the higher hydrophilicity than that of the pressure surface 21P is formed around the grooves R1 and R2 on the pressure surface 21P. The end portion on the downstream side of the plurality of grooves R1 and R2 is connected to the gap S2 serving as the slit S that captures the liquefied component of the steam.

According to the above-described configuration, the liquid film formed on the pressure surface 21P can be guided by the groove R1, and thereafter, can be immediately captured by the gap S2. The gap S2 is a gap between the turbine stator vane 21 and the turbine rotor vane 31. Therefore, for example, compared to a case where the slit is formed only on the pressure surface 21P, more liquid veins can be captured. In this manner, it is possible to further reduce the possibility that the liquid film may be scattered on the downstream side.

(15) According to a fifteenth aspect, in the steam turbine 100, the turbine stator vane 21 further includes the hollow slit S1 formed on the downstream side on at least the pressure surface 21P, and extending in the radial direction.

According to the above-described configuration, the hollow slit S1 is formed in the portion on the downstream side on at least the pressure surface 21P. In this manner, the liquid film formed on the pressure surface 21P can be guided by the groove R2, and thereafter, can be immediately captured by the hollow slit S1. As a result, it is possible to further reduce a possibility that the liquid film may be scattered on the downstream side.

INDUSTRIAL APPLICABILITY

According to the present disclosure, it is possible to provide a turbine stator vane and a turbine stator vane assembly which can effectively remove a liquid film by further reducing growth of the liquid film.

REFERENCE SIGNS LIST

100 steam turbine
1 steam turbine rotor
2 steam turbine casing
3 rotary shaft
4A journal bearing
4B thrust bearing
11 shaft end
12 steam supply pipe
13 steam discharge pipe
20 stator vane
21 stator vane body
21F leading edge
21P pressure surface
21Q suction surface
21R trailing edge
22 stator vane shroud
24 outer peripheral ring
24A ring upstream surface
24B ring inner peripheral surface
24C ring downstream surface
30 rotor vane
31 rotor vane body
32 platform
34 rotor vane shroud
34A shroud upstream surface
34B shroud inner peripheral surface
34C shroud downstream surface
F fillet portion
O axis
R1, R2 groove
R3 ring groove
S slit
S1 hollow slit
S2 gap
W hydrophilic uneven region

The invention claimed is:

1. A turbine stator vane assembly comprising:

a pressure surface extending in a radial direction intersecting with a flow direction of steam, and facing an upstream side in the flow direction; and a suction surface facing a downstream side in the flow direction, wherein a plurality of grooves extending outward in the radial direction toward the downstream side are formed on at least the pressure surface, a hydrophilic uneven region having higher hydrophilicity than that of the pressure surface is formed around the grooves on the pressure surface, and an end portion on a downstream side of the plurality of grooves is connected to a slit that captures a liquefied component of the steam, wherein the turbine stator vane assembly further includes an outer peripheral ring provided in an outer end portion of a turbine stator vane in the radial direction, and a fillet portion that connects the turbine stator vane and an inner peripheral surface of the outer peripheral ring, wherein a ring groove is formed on the inner peripheral surface of the outer peripheral ring, and the ring groove is connected to a groove of the plurality of grooves and extends toward the downstream side along the inner peripheral surface of the outer peripheral ring, wherein the fillet portion is curved in a direction away from a turbine stator vane side toward the inner peripheral surface of the outer peripheral ring side, and wherein the ring groove is formed on the inner peripheral surface side from the fillet portion.

2. The turbine stator vane assembly according to claim 1, wherein the slit is a hollow slit formed on the downstream side on at least the pressure surface and extends in the radial direction.

3. The turbine stator vane assembly according to claim 1, wherein a starting point of the ring groove is provided at a position biased to a leading edge side on the pressure surface.

4. The turbine stator vane assembly according to claim 1, wherein the slit is a hollow slit formed on the downstream side on at least the pressure surface, and extending in the radial direction.

5. A turbine stator vane assembly comprising:

a turbine stator vane including a pressure surface extending in a radial direction intersecting with a flow direction of steam, and facing an upstream side in the flow direction, and a suction surface facing a downstream side in the flow direction; and an outer peripheral ring provided in an outer end portion of the turbine stator vane in the radial direction, wherein a plurality of grooves extending outward in the radial direction toward the downstream side are formed on at least the pressure surface, a ring groove connected to a groove of the plurality of grooves and extending toward the downstream side along an inner peripheral surface of the outer peripheral ring is formed on the inner peripheral surface of the outer peripheral ring, and an end portion on the downstream side of the plurality of grooves is connected to a slit that captures a liquefied component of the steam, wherein the turbine stator vane assembly further includes a fillet portion that connects the turbine stator vane and the inner peripheral surface, the fillet portion being curved in a direction away from a turbine stator vane side toward the inner peripheral surface of the outer peripheral ring side, and wherein the ring groove is formed on the inner peripheral surface side from the fillet portion.

6. The turbine stator vane assembly according to claim 5, wherein a starting point of the ring groove is provided at a position biased to a leading edge side on the pressure surface.

7. The turbine stator vane assembly according to claim 5, wherein the slit is a hollow slit formed on the downstream side on at least the pressure surface, and extending in the radial direction.

8. The turbine stator vane assembly according to claim 1, wherein a portion including an end portion on the downstream side on the inner peripheral surface of the outer peripheral ring is curved outward in the radial direction from the upstream side toward the downstream side.

9. The turbine stator vane assembly according to claim 1, wherein in a sectional view including an axis, an extension line formed by extending the inner peripheral surface of the outer peripheral ring to the downstream side intersects with a shroud upstream surface facing a turbine rotor vane located on the downstream side in the radial direction.

10. A steam turbine comprising:

a turbine stator vane extending in a radial direction intersecting with a flow direction of steam;

an outer peripheral ring provided in an outer end portion of the turbine stator vane in the radial direction, a turbine rotor vane disposed with a gap on a downstream side of the turbine stator vane in the flow direction; and a turbine casing that covers the turbine stator vane and the turbine rotor vane from an outer peripheral side, wherein the turbine stator vane includes a pressure surface facing an upstream side in the flow direction, and a suction surface facing a downstream side in the flow direction, a plurality of grooves extending outward in the radial direction toward the downstream side are formed on at least the pressure surface, a hydrophilic uneven region having higher hydrophilicity than that of the pressure surface is formed around the grooves on the pressure surface, and an end portion on the downstream side of the plurality of grooves is connected to the gap, which serves as a slit that captures a liquefied component of the steam, a ring groove connected to a groove of the plurality of grooves and extending toward the downstream side along an inner peripheral surface of the outer peripheral ring is formed on the inner peripheral surface of the outer peripheral ring, and a fillet portion that connects the turbine stator vane and the inner peripheral surface, wherein the fillet portion is curved in a direction away from a turbine stator vane side toward the inner peripheral surface of the outer peripheral ring side, and the ring groove is formed on an inner peripheral surface side from the fillet portion.

11. The steam turbine according to claim 10, wherein the slit includes a hollow slit formed on the downstream side on at least the pressure surface, and extending in the radial direction.

* * * * *